(12) United States Patent
Zhang

(10) Patent No.: US 8,024,503 B2
(45) Date of Patent: Sep. 20, 2011

(54) SYSTEM AND METHOD FOR ACCESSING INTERNET VIA TV AND A PC CONNECTING SET AND A TV CONNECTING SET

(75) Inventor: Weiming Zhang, Shanghai (CN)

(73) Assignee: Shanda Computer (Shanghai) Co., Ltd., Shanghai (CN)

( * ) Notice: Subject to any disclaimer, the term of this patent is extended or adjusted under 35 U.S.C. 154(b) by 16 days.

(21) Appl. No.: 12/309,600

(22) PCT Filed: Aug. 10, 2007

(86) PCT No.: PCT/CN2007/002397
§ 371 (c)(1),
(2), (4) Date: Jan. 23, 2009

(87) PCT Pub. No.: WO2008/019595
PCT Pub. Date: Feb. 21, 2008

(65) Prior Publication Data
US 2009/0199253 A1    Aug. 6, 2009

(30) Foreign Application Priority Data

Aug. 11, 2006 (CN) .......................... 2006 1 0062062

(51) Int. Cl.
*G06F 13/00* (2006.01)
*H04N 7/173* (2011.01)
(52) U.S. Cl. ........................ 710/100; 725/109
(58) Field of Classification Search .................. 710/100; 725/109
See application file for complete search history.

(56) References Cited

U.S. PATENT DOCUMENTS

| | | | |
|---|---|---|---|
| 6,356,968 B1* | 3/2002 | Kishon | 710/306 |
| 6,675,054 B1* | 1/2004 | Ruberg | 700/94 |
| 6,678,733 B1* | 1/2004 | Brown et al. | 709/229 |
| 6,727,959 B2* | 4/2004 | Eskin | 348/674 |
| 6,809,776 B1* | 10/2004 | Simpson | 348/565 |
| 7,116,376 B2* | 10/2006 | Yun | 348/552 |
| 7,227,590 B2* | 6/2007 | Jung et al. | 348/725 |
| 7,243,365 B1* | 7/2007 | Rahman | 725/109 |
| 7,299,304 B2* | 11/2007 | Saint-Hilaire et al. | 710/11 |
| 7,441,193 B1* | 10/2008 | Wild et al. | 715/733 |
| 7,567,295 B2* | 7/2009 | Jan | 348/552 |
| 7,694,118 B2* | 4/2010 | Kawabe | 713/1 |

(Continued)

FOREIGN PATENT DOCUMENTS

CN          2754294 Y     1/2006

(Continued)

OTHER PUBLICATIONS

Ramesh Jain; , "PC and TV convergence: is it finally here?," Multimedia, IEEE , vol. 9, No. 4, pp. 103-104, Oct.-Dec. 2002.*

(Continued)

*Primary Examiner* — Faisal M Zaman
(74) *Attorney, Agent, or Firm* — Oliff & Berridge, PLC

(57) ABSTRACT

A system and method of television internet and interactive entertainment, as well as a computer PC box and a television TV box for realizing the television internet and interactive entertainment are provided. Via the computer interface module in the computer PC box and the television interface module in the television TV box, the computer and the television are connected, and the television internet and the interactive entertainment are realized.

21 Claims, 12 Drawing Sheets

U.S. PATENT DOCUMENTS

| | | | |
|---|---|---|---|
| 2001/0004257 A1* | 6/2001 | Nitta et al. | 345/211 |
| 2002/0024956 A1 | 2/2002 | Keller-Tuberg | |
| 2002/0051083 A1* | 5/2002 | Aratani et al. | 348/554 |
| 2002/0092028 A1* | 7/2002 | Lin et al. | 725/93 |
| 2004/0031058 A1* | 2/2004 | Reisman | 725/112 |
| 2004/0257320 A1* | 12/2004 | Wang et al. | 345/87 |
| 2005/0005306 A1* | 1/2005 | Kim et al. | 725/131 |
| 2005/0108760 A1 | 5/2005 | Iwamura | |
| 2006/0010385 A1* | 1/2006 | Sasaki | 715/718 |
| 2006/0023071 A1* | 2/2006 | Mori et al. | 348/207.99 |
| 2006/0171689 A1* | 8/2006 | Smith | 386/125 |
| 2007/0011715 A1* | 1/2007 | Hsuan | 725/133 |
| 2007/0052696 A1* | 3/2007 | Uehara | 345/204 |
| 2007/0061414 A1* | 3/2007 | Bakke | 709/217 |
| 2007/0083903 A1* | 4/2007 | Wan et al. | 725/100 |
| 2008/0145032 A1* | 6/2008 | Lindroos et al. | 386/124 |
| 2010/0175097 A1* | 7/2010 | Zhang | 725/109 |

FOREIGN PATENT DOCUMENTS

| | | | | |
|---|---|---|---|---|
| JP | 08087784 | A | * | 4/1996 |
| JP | 1108860 | A | * | 3/1999 |
| JP | 11088860 | A | * | 3/1999 |
| JP | 2002064888 | A | * | 2/2002 |
| JP | 2003208369 | A | * | 7/2003 |
| JP | 2007060533 | A | * | 3/2007 |
| JP | 2007133849 | A | * | 5/2007 |
| WO | WO 2006088263 | A2 | * | 8/2006 |

OTHER PUBLICATIONS

Hyoung Joong Kim; Kee-Chun Bang; , "A model of GUI for interactive TV," TENCON 99. Proceedings of the IEEE Region 10 Conference , vol. 2, pp. 1514-1517 vol. 2, Dec. 1999.*

Tomari, Y.; Saito, M.; Okada, N.; Yoshida, R.; , "Design and Implementation of Internet-tv," Consumer Electronics, 1997. Digest of Technical Papers. ICCE., International Conference on , pp. 228-229, Jun. 11-13, 1997.*

Haraikawa, T.; Sakamoto, T.; Hase, T.; Mizuno, T.; Togashi, A.; , "μVNC: a proposal for Internet connectivity and interconnectivity of home appliances based on remote display framework," Consumer Electronics, IEEE Transactions on , vol. 47, No. 3, pp. 512-519, Aug. 2001.*

* cited by examiner

SYSTEM AND METHOD FOR ACCESSING INTERNET VIA TV AND A PC CONNECTING SET AND A TV CONNECTING SET

FIELD OF TECHNOLOGY

This invention describes technology of accessing internet through a television set, particularly, a system and method for accessing internet via TV and interactive entertainment. This invention also involves a PC box and TV box that are used to realize television internet access and interactive entertainment.

DESCRIPTION OF THE RELATED ART

With development of internet technology and the spread of broad band, multimedia contents on the internet that covers almost all aspects of social life is becoming increasingly rich and diversified. Various types of internet-based multimedia communication and exchange tools have gradually become the mainstream. The internet has gone from being a mere tool for communication and the acquisition of data to being a comprehensive platform used for working, studying, communication and entertainment. People are becoming increasingly dependant on the internet in their everyday life and work. Moreover, the number of internet users worldwide, particularly broad band users, is continuing to grow rapidly. Residences are the main points of internet access other than the workplace, and therefore the number of family broadband users has increased most rapidly in recent years.

Today, it has become very popular for people to use a PC for their study to access and enjoy multimedia content via the internet, for example, download films and various types of multimedia files or save their digital photos and film tapes. However, the problem is users are unable to have a highly relaxing experience and comfortable environment when they are enjoying such multimedia content on the PC screen, particularly for long time working.

Currently, there have no useful solution for users comfortably enjoying the multimedia content via internet or the contents that saved in the hardboard of the personal PC far away from his bedroom, for example his personal PC or internet sever was set in his other room. Currently, the ordinary settling solution is to set another entertainment PC to do this content. This PC has no different function with our personal PC, this would bring more extra expense to users, and additional personal PC would bring the user other matters, for example, more maintenance for PC, more work for PC software update, more computer virus prevention and so on.

Another method is to apply IPTV services from an IPTV service provider. User can enjoy these contents via internet with a set-top-box, but there still have a lot of questions in this solution. First, IPTV service is not popular in everywhere, and the contents that provided by service provider were limited. The second, the IPTV service not includes sharing contents that saved in personal PC and this is difficult to deal with sharing matters. This third question is if the user apply IPTV, he need pay more fee for this service.

DESCRIPTION OF THE INVENTION

This invention provides a simple system and method for accessing internet via TV. And the same time, provides a TV connecting box and a PC connecting set. This invention adopts the TV set that the users have to save the user's expense on family interactive entertainment products. This invention also provide solution on program recording, time shifting, and interactivity between the audience and the program contents.

For settling these questions, this invention provides:

A computer connecting set, includes: PC host, the described PC host is designed with computer interface module, the described computer interface module includes PC video signal sending driver circuit, communicating line interface on PC port, display card interface on PC port, USB driver circuit on PC port. One port of the PC video signal driver is connecting with display card interface, the other port of the PC video signal diver is connecting with communicating line on the PC port. One port of the USB diver circuit is connecting with USB interface of the PC, the other port is connecting with communicating line on the PC port.

The said computer interface module is also designed with VGA signal multi-use circuit and VGA signal output interface. VGA signal output interface is connecting with display card interface via VGA signal multi-use circuit.

The said computer interface module is also designed with PC video signal converter circuit. One of it's port is connecting with display card interface of PC, the other port is connecting with PC video signal driver circuit.

As one priority option, the computer interface module is also designed with USB display card circuit and USB display card interface. One port of the USB display card circuit is connecting with PC video signal converter circuit, and the other port is connecting with USB display card interface.

The said USB display card circuit has bridge connecting circuit and display card circuit from USB to PCI, one port of the bridge connecting circuit is connecting with USB display card interface, and the other port is connecting with display card interface via PCI wire bus.

This invention also provides a TV connecting set, includes: TV host, the said TV host is designed with the TV interface module, the said TV interface module is designed with TV video signal receiving circuit, USB driver circuit on TV port, USB Hub circuit, communicating line interface on TV port, and the video interface on TV port. One port of the TV video signal receiving circuit is connecting with TV video interface, the other port is connecting with communicating line of the TV port. One port of the USB driver circuit is connecting with the USB Hub circuit of the system, and the other port is connecting with the communicating line interface on TV port.

The said TV interface module is also designed with TV video signal convert circuit, one port is connecting with signal interface of TV, and the other port is connecting with TV video signal receiving circuit.

As one priority option, the said TV interface module is also designed with USB sets USB interface circuit on TV port, the said USB set is connecting with USB Hub circuit, TV USB interface is connecting with USB Hub circuit.

The said USB set is USB sound card, USB sound card is connecting with USB Hub circuit, the said USB sound card is designed with audio interface and microphone interface on the TV port. The said USB set is USB-PS2 interface converters USB infrared receivers USB RF receiver and USB audio/video compress and so on.

The invention also provides a system for accessing internet via TV and interacting, includes: PC, TV and communicating wires. the system includes the said PC connecting set, and the said TV connecting set. The personal computer's display card is connecting with the display card interface of the PC connecting set, the personal computer's USB interface is connecting with USB interface of the PC connecting set. USB driver circuit on the PC connecting set receives the signals that form personal computer to USB sets, and output the signals via driver and communicating wire PC port interface, and on the opposite side, USB driver circuit on the PC connecting set receive the USB signal from communicating line via communicating line interface, and send it to the personal computer. The communicating line interface on the PC connecting set is connecting with communicating line interface on the TV connecting set via communicating line, so the signal communication between TV module and PC module is to be active. the video interface on the TV connecting set is connecting with video interface on the TV, the audio interface on the TV connecting set is connecting with audio interface on the TV. The USB driver circuit on the TV connecting set receives USB signal that send from USB set, and output the signals via communicating lien interface, and on the opposite side, receives USB signals form communicating line via communicating line interface and sends it to the USB Hub circuit.

The VGA output interface of the PC connecting set is connecting with monitor.

The communicating line is the ordinary CAT5 line, CAT5E line or the line that composed with four double of twist-pair line. The USB interface includes USB 1.0 interfaces USB 1.1 interface, USB 2.0 interface.

As one priority option, the personal computer includes the second display card, the first display card is connecting with the PC connecting set display card interface, and the second display card is connecting with the monitor, or the first display card is connecting with the monitor and the second display card is connecting with the PC connecting set display card interface.

As the improved solution of the priority option, the interface module that the second display card connecting with the personal computer is designed to be PCI multi-use card. The said multi-use card is set in the personal computer and connecting with TV interface module via communicating lien.

The said first display card and the second display card may be the integrated display card or the individual display card which inserted in the computer main board PCI, AGP, PCI-Express. As one priority option, this system also includes external USB sets, the said external USB sets is connecting with USB interface of the TV connecting set, the said USB sets should be USB sound card, UBS-PS2 interface inverter, USB infrared receiver, USB RF receiver, and USB audio/video gather and compress set and so on.

The said microphone interface on the TV connecting set is connecting with microphone.

The said audio output interface of the USB sound card includes the double track (left and right) to connect with TV set, and the 5.1 fiber audio interface which can be connecting with the family stereo set.

Additionally, the said system, is made up with personal computer's USB interface, USB Hub circuit in the TV interface modules USB interface sets and external USB sets. The display card interface of the personal computer outputs the video signal to TV set via the computer interface module and the TV interface module.

Preferably, USB video and audio gathering module sends the TV's video and audio signal from the TV signal source to the personal computer via the TV interface module and the computer interface module. The said TV signal source includes digital TV set-top-box, analog signals TV tuner. The USB infrared receiver receives the signals from remote sets.

The USB display card circuit in the computer interface module is connecting with the personal computer via the USB port in the PC connecting set, to receive the data from the computer, convert this data to video signals and send it to the video signal convert circuit in the PC connecting set.

This invention also describes a method for operating this system. The said operating mode includes single-working station and dual-working station.

The said single-workstation mode has the following operating steps: the PC user and TV user jointly control a single set of application software running in the operating system of the PC through their respective keyboard, mouse or remote controller, and enjoy the same displayed content and sounds.

The said dual-workstation mode has the following operating steps: the PC user and TV user each control a set of application software independently that is running in the operating system of the PC through their respective keyboard, mouse or remote controller and enjoy independently displayed content and sounds.

In addition, a multi-workstation mode may also be adopted if there are several monitors available. In this case, each PC user and TV user controls a set of application software independently that is running in the operating system of the PC through their respective keyboard, mouse or remote controller and enjoys independently displayed content and sounds.

Compared with existing technologies, this invention makes full use of the user's computer that they have. It offers a cheap and powerful solution for accessing internet, and makes it simple. Users can easily enjoy the content from internet in his home via TV. This invention also can make the program records time-shifting and the interactive with the users to be true.

DETAILED DESCRIPTION

Figure 1:
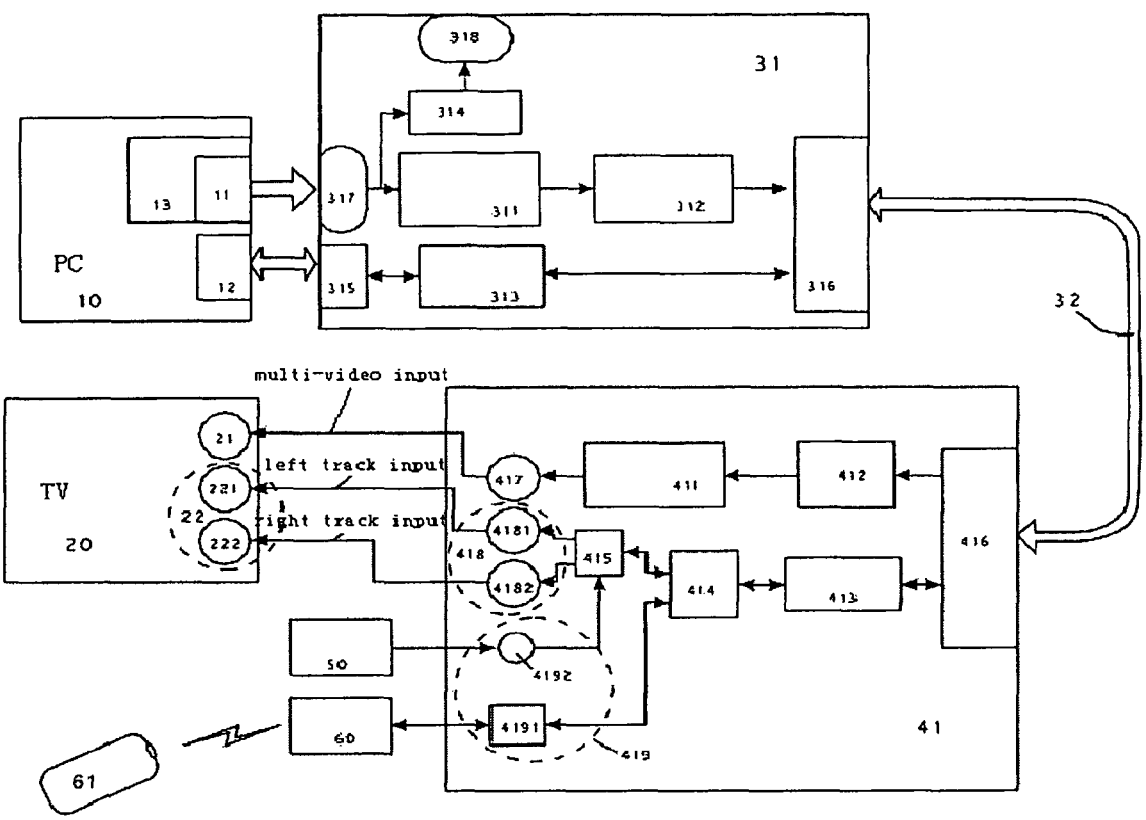
FIG. 1 is a schematic diagram showing the structure of the system and their connection.
Figure 16:
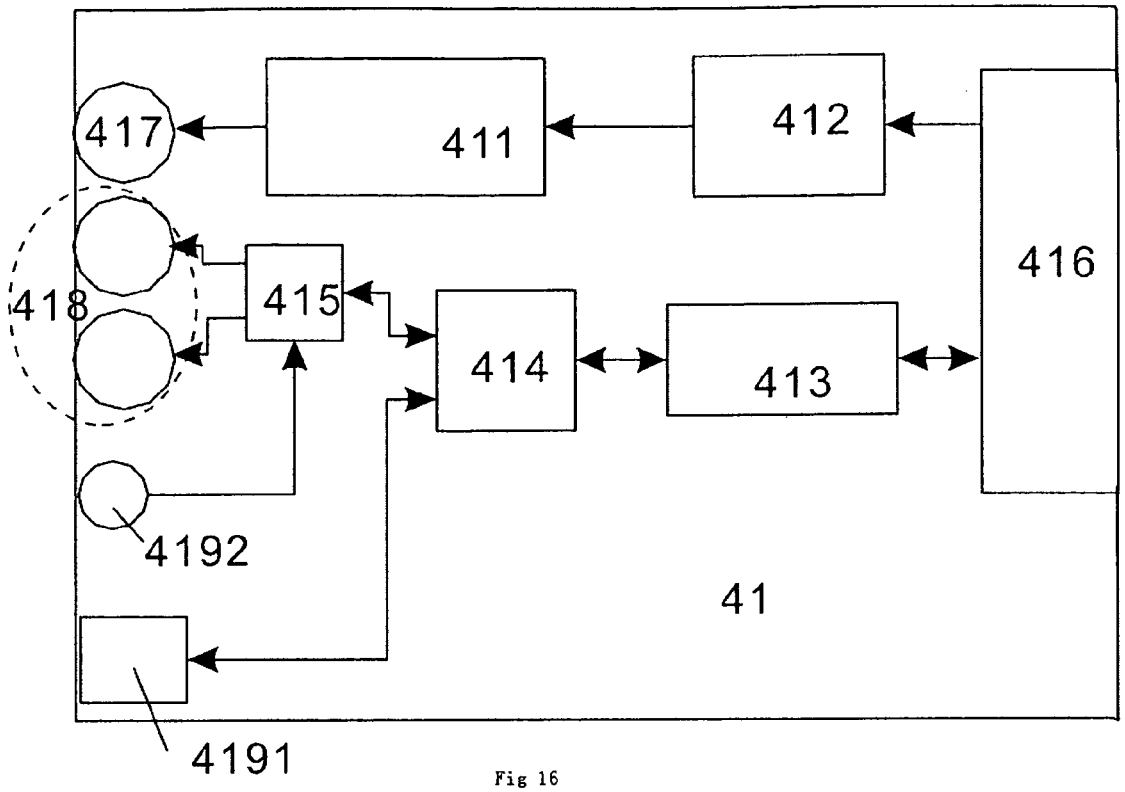
FIG. 16 is a modular structure of the TV connecting set.
Figure 17:
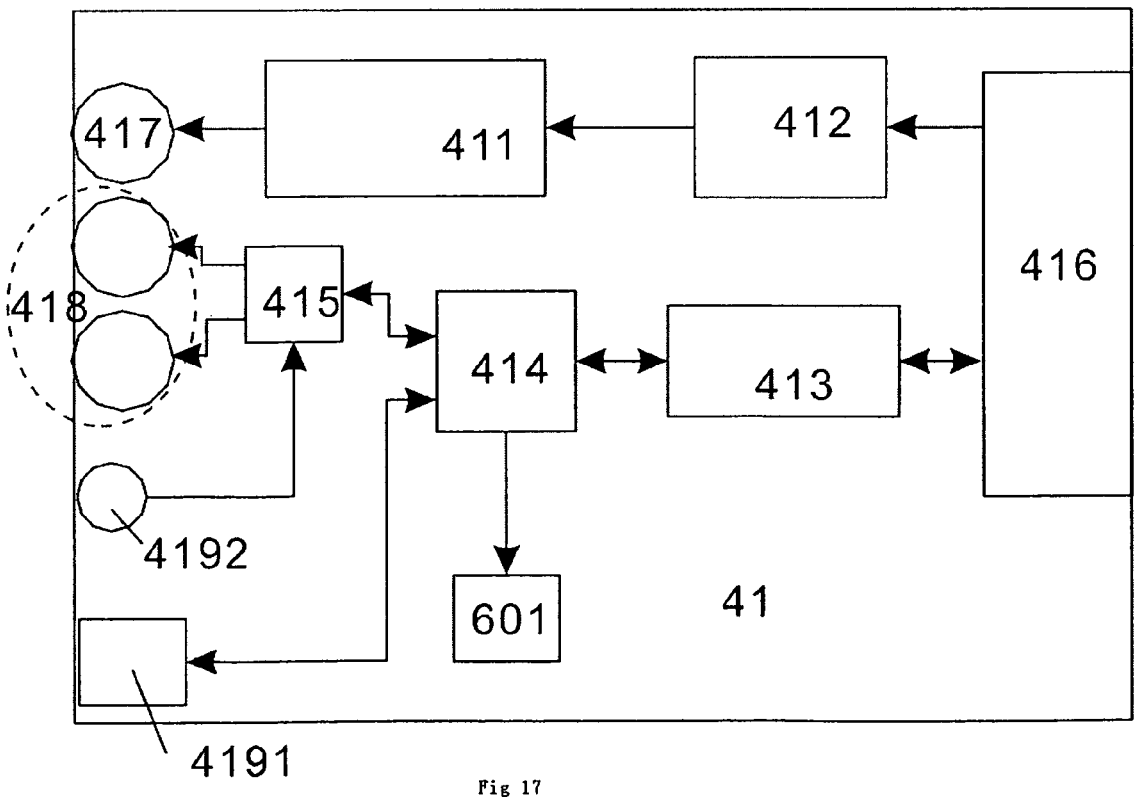
FIG. 17 is an another structure of the TV connecting set.

The following is a detailed description of this invention with reference figures:

Please refer to FIG. 1, FIG. 16 and FIG. 17, The system includes PC 10, PC connecting set 30, communication cable 32, TV connecting set 40, TV 20 and external USB device, wherein, PC connecting set 30 is designed with a PC interface module 31 and TV connecting set is designed with a TV interface module 41.

PC interface module 31 includes PC video signal converting circuit 311, PC video signal driver circuit 312, PC port communication cable interface 316, PC port graphics card interface 317, VGA signal multiplexing circuit 314, VGA output interface 318, PC port USB driver circuit 313 and PC port USB interface 315. One port of PC video signal converting circuit 311 is connecting with the PC display card interface A11 via the PC port display card interface 317, and the other port of the PC port communication line interface 316 via PC video signal driver circuit 312. One port of VGA output interface 318 is connecting with the monitor and the other port is connecting with the PC port display card interface 317 via VGA signal multi-use circuit 314. One port of PC port USB driver circuit 313 is connecting with the personal computer's USB interface 12 via PC port USB interface 315 and the other port is connecting with the communication line interface 316.

The TV has video input interface B21 and audio interface B22. Audio interface B22 has the left track audio interface 221 and the right track audio interface 222.

The TV interface module 41 has TV video signal converting circuit 411, TV video signal receiving circuit 412, TV port USB driver circuit 413, USB Hub circuit 414, TV port USB interface 4191, TV port communication line interface 416, TV port video interface 417, USB sound card 415, TV port microphone interface 4192 and TV port audio interface 418. One port of TV video signal converting circuit 411 is connecting with the TV video input interface B21 via TV port video interface 417 and the other port is connecting with TV port communication line interface 416 via TV video signal receiving circuit 412. One port of TV USB driver circuit 413 is connecting with USB Hub circuit 414 of the system and another port is connecting with TV-side communication line interface 416. TV port communication line interface 416 is connecting with PC port communication line interface 316 via a communication line. USB Hub circuit 414, USB sound card 415 and TV port audio interface 418 are connecting one by one. TV port audio interface 418 is further divided into TV port left-track audio interface 4181 and TV port right-track audio interface 4182 that are connecting with the left-track audio interface 221 and right-track audio interface 222 of the TV. External USB device 60 receives the signals from remote controller 61 and is connecting with USB Hub circuit 414 via TV port USB interface 4191. Microphone 50 is connecting with USB sound card 415 via TV port microphone interface 4192.

As FIG. 17 shows, TV interface module is integrated with USB device 601, which is connected to USB Hub circuit 414.

The PC port USB drive circuit 313 receives the primary signals transmitted by the PC to the USB device and outputs the signals via the PC port communication line interface, on the other hand, it receives the secondary USB signals from the communication line via the PC port communication line interface and transmits the signals to the PC.

The TV port USB driver circuit 413 receives the secondary USB signals that are transmitted by the USB device and forwarded by the USB Hub circuit and then outputs the driven signals via the TV port communication line interface. On the other hand, it receives the primary USB signals from the communication line via the communication cable interface and sends them to the USB Hub circuit.

Display card interface A11, video input interface B21 and TV port video interface 417 or PC port display card interface 317 are either VGA, S-Video, composite video or DVI interfaces. Communication line is an ordinary CAT5 cable, CAT5E cable or a combination of four twisted-pairs.

In this system, external USB device 60 is one of a USB-PS2 interface converter, USB infrared receiver, USB radio-frequency receiver, USB A/B collection and compression device or a combination thereof. USB A/V gathering and compressing device gather and compress the TV A/V signals transmitted by the TV A/V signal source and transmits them to the PC via USB interface 12. TV A/V signal sources include digital TV set-top-boxes and analog TV tuners. The USB infrared receiver is used to receive the infrared signals transmitted by the remote controller. The USB radio-frequency receiver is used to receive radio frequency signals. The USB interface includes a standard USB 1.0 interface, USB 1.1 interface and USB2.0 interface.

The USB-PS2 interface converter, USB infrared receiver, USB radio-frequency receiver and USB A/V gathering and compressing device of the USB device can either be one of the TV interface inner module or connecting with the system as a peripheral device.

Working mechanism in FIG. 1:

In FIG. 1, the VGA signals output from display card 13 of the PC are converted into S-Video by PC video signal converter circuit 311 of PC interface module 31 and then transmitted to communication line 32 by PC video signal transmission driver circuit 312. PC port USB driver circuit 313 of PC interface module 31 receives the primary USB signals from PC USB interface 12 and sends the signals to communication line 32; it also receives the secondary USB signals from the communication line and sends the demodulated signals to the PC.

In FIG. 1, PC interface module 31 has a VGA signal multiplexing circuit 314 to send the VGA signals from PC host to VGA output interface 318. When the PC works in the single-workstation mode, this VGA output interface 318 of the PC interface module can be connecting with PC monitor 18.

As FIG. 1 shows, TV video signal receiving circuit 412 receives the video signals of PC 10 via communication line 32 and converts them back to S-Video signals that are then converted into composite video signals by TV video signal converting circuit 411 for transmission to TV 20. We can get the video signals output from PC 10 that are displayed on the screen of TV 20.

As FIG. 1 shows, TV interface module 41 has a USB sound card 415. PC 10 outputs dual-track audio signals that are output to TV 20 via PC USB interface 12, PC interface module 31, communication line 32 and TV port USB driver circuit 413, USB Hub circuit 414 and USB sound card 415 of TV interface module 41. External USB device 60 receives wireless control signals and audio signals from microphone 50 that are transmitted from the opposite direction to PC 10.

Figure 2:
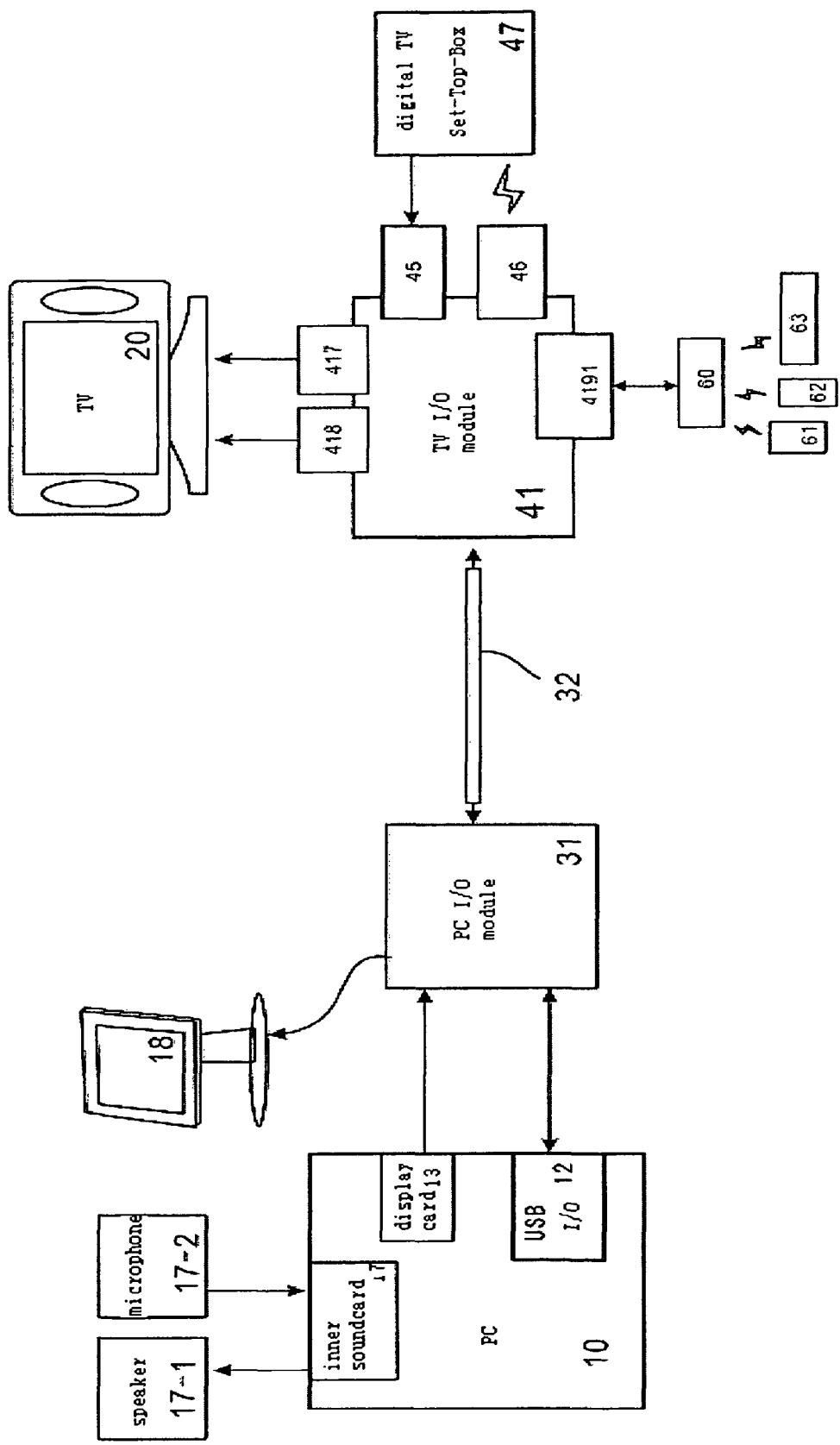
FIG. 2 is a schematic diagram of the single-workstation mode.

FIG. 2 shows the single-workstation mode of this invention. The PC user and TV user individually control a single set of application software running in the operating system of the PC (10) through their individual keyboard, mouse or remote controller. The inner sound card 17 of PC 10 is connecting with loudspeaker 17-1 and microphone 17-2 respectively and monitor 18 is connecting with PC interface module 31. Wireless keyboard 63, wireless mouse 62 or remote controller 61 of the TV users are connecting with TV port USB interface 4191 via a wireless receiver for relevant operations. Digital TV set-top-box 47 is connecting with TV interface module 41 via USB A/V gathering and compressing device 45 or infrared transmitter 46. TV interface module 41 is connecting with TV 20 via TV port audio interface 418 and TV port video interface 417.

TV interface module 41 can be added with the TV A/V signal inputs from the digital TV set-top box so the PC user can enjoy and record cable digital TV programs on the PC and the TV user 5 can enjoy such functions as time shifting of TV program and TV program interaction as well as watching TV programs previously recorded on the hard disk of the PC 10.

Figure 3:
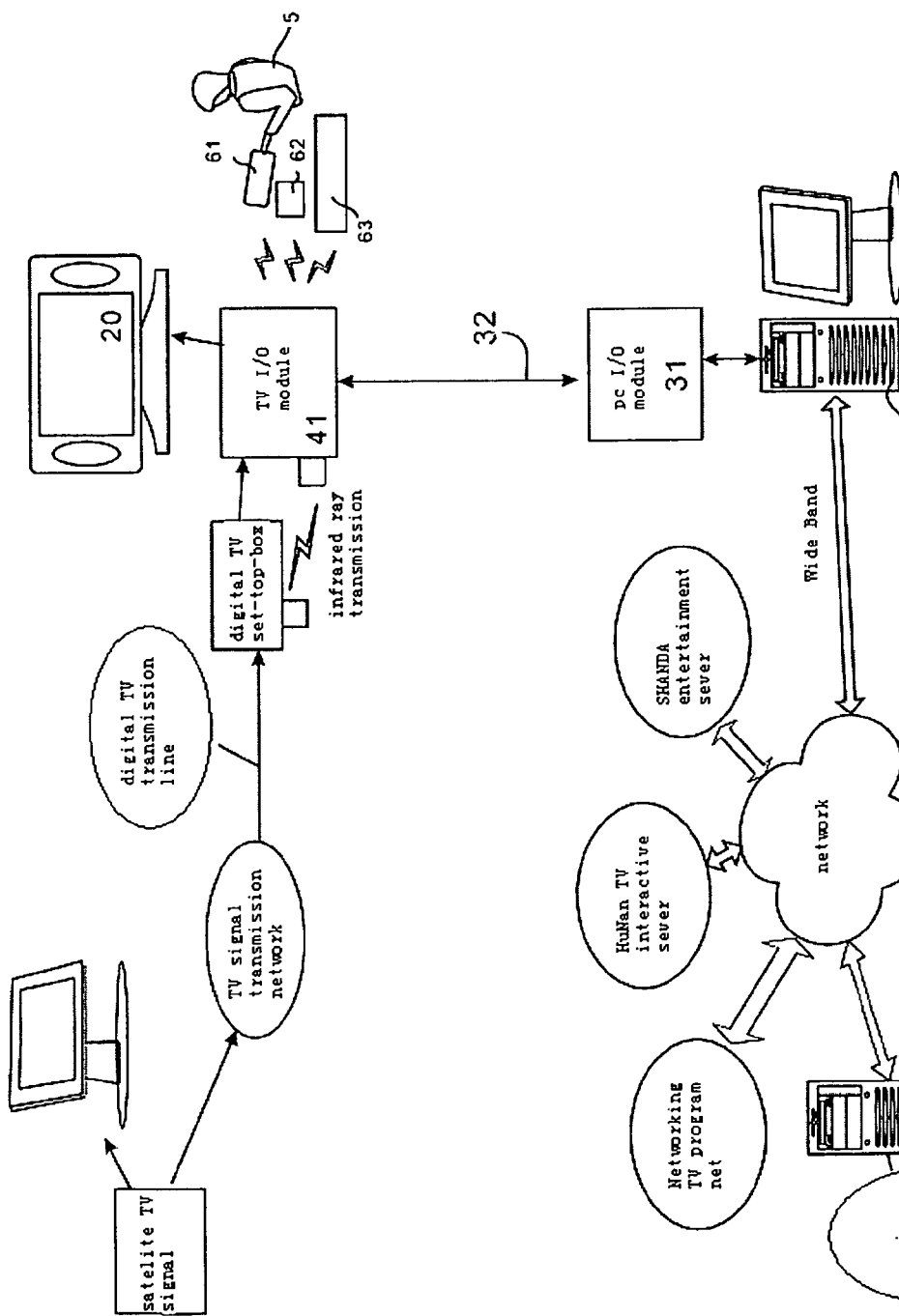
FIG. 3 is a schematic diagram of an application system.

FIG. 3 shows that PC 10 and TV 20 are joined together via PC interface module 31, communication cable 32 and TV interface module 41. Remote controller 61, wireless mouse 62 and wireless keyboard 63 control PC 10 by remote via TV interface module 41. PC 10 is connected to the internet via broadband interface.

All multimedia content from the internet is first processed by PC 10 and then transmitted to TV 20 in the form of A/V signals. TV user 5 controls the multimedia content in an interactive manner via the USB device in TV interface module 41. The TV A/V signals from the digital TV set-top box in TV interface module 41 enable the PC user to watch and record cable digital TV programs on the PC. The TV user 5 can enjoy such functions as time shifting of TV program time and TV program interaction as well as being able to watch the TV programs previously recorded on the hard disk of PC 10.

For example, the TV user is watching the show "Dae Jang Geum" on Hunan Satellite television and leaves from the television set for 23 minutes. Upon returning to the television set, the user can go back and watch video that was recorded 23 minutes ago with the time shifting movement function.

TV program time shifting can be realized in the following method:
(1) The TV program Dae Jang Geum is transmitted to the digital TV set-top box via the cable digital TV network. Next, it is sent to TV interface module 41 and then transmitted to PC 10 via communication line 32 and PC interface module 31.
(2) The TV user 5 presses the "TV pause" button on PC remote controller 61 before he/she left away;
(3) The USB infrared receiver that is connecting with TV interface module 41 receives the "TV pause" signal and sends it to PC 10.
(4) Upon receiving of the "TV pause" signal, PC 10 puts off the program and the program on the television screen is paused.
(5) When the TV user 5 comes back 23 minutes later, he/she presses the "TV play" button on PC remote controller 61.
(6) Upon receiving of the instruction to play the program, PC 10 starts to play the video that stored in the cache from 23 minutes ago and continues to store programs currently being broadcast by the cable digital TV station in the cache.

Figure 4:
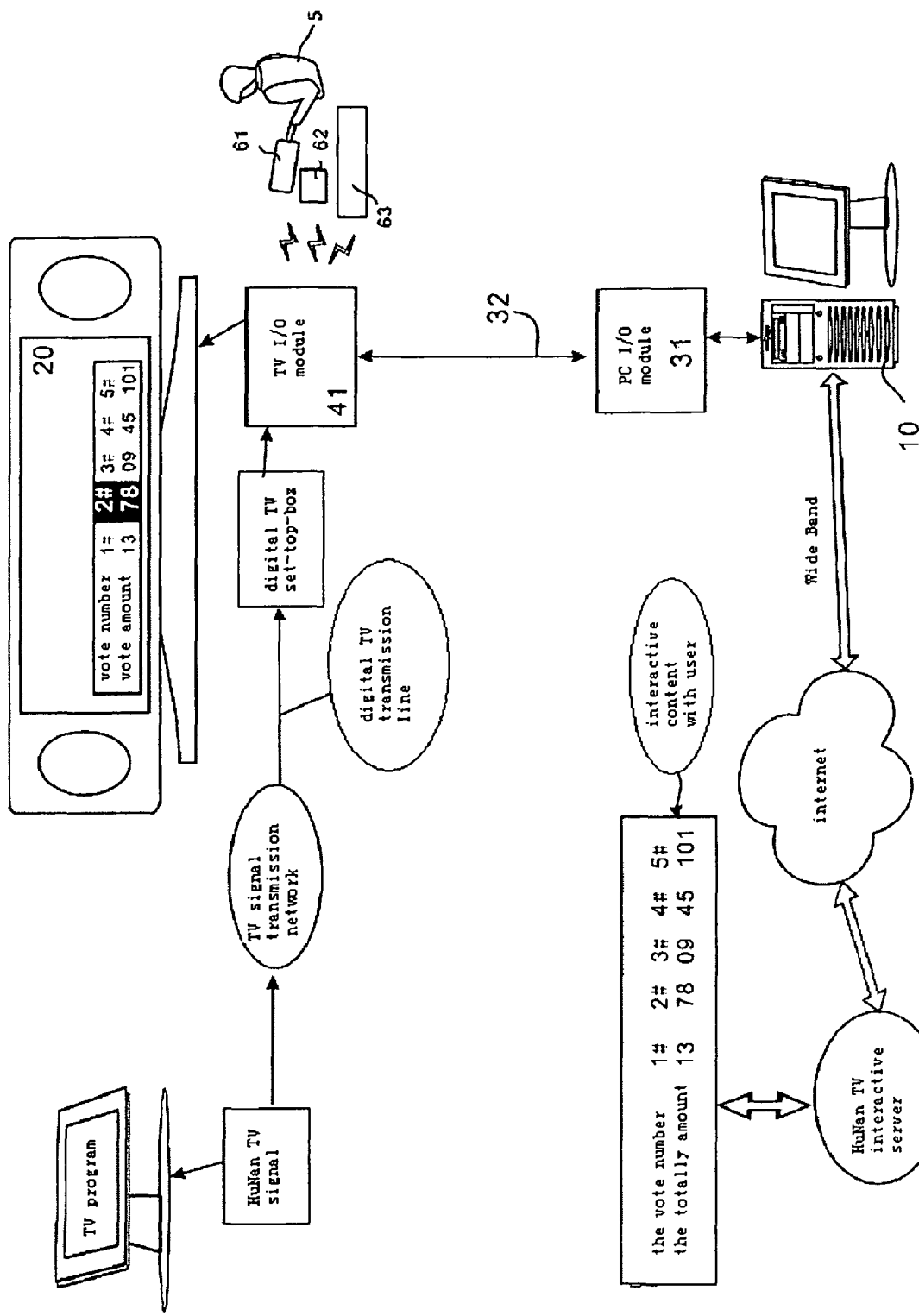
FIG. 4 is a schematic diagram of the TV program interactions example.

FIG. 4, For instance, Hunan TV is broadcasting the "Super Girl" singing contest through the cable digital TV system and has also provided an "interactive server" on the internet. PC 10 can download and install the interactive software of Hunan TV in advance. When the TV user 5 presses the "TV interaction" button with wireless remote controller 61, the TV screen will display the "interaction window" for "Super Girl" contest. The live broadcast and interactive voting menu are displayed on the television screen simultaneously All the audience can cast their vote with the remote controller and get the information and real-time results of the vote via the interactive interface. This example shows our designed voting process as follows with the help of interactive software:
1. A TV user who intends to vote "#2" presses key number "2" following with the interactive interface remind;
2. After the user presses number "2", the red color as displayed on the interactive interface will turn green.
3. The TV user presses OK button and the "interactive interface" will show a message indicating that voting has finished;
4. The "interactive interface" continues to display the latest standings among these competitors;

Meanwhile, the USB camera of TV 20 is connecting with PC 10 via TV interface module 41. Hunan TV can get a video interview of any TV user at any time through the interactive server via the internet and display the image of the user on the TV screen so that TV users all over the country can take part in TV programs.

Figure 5:
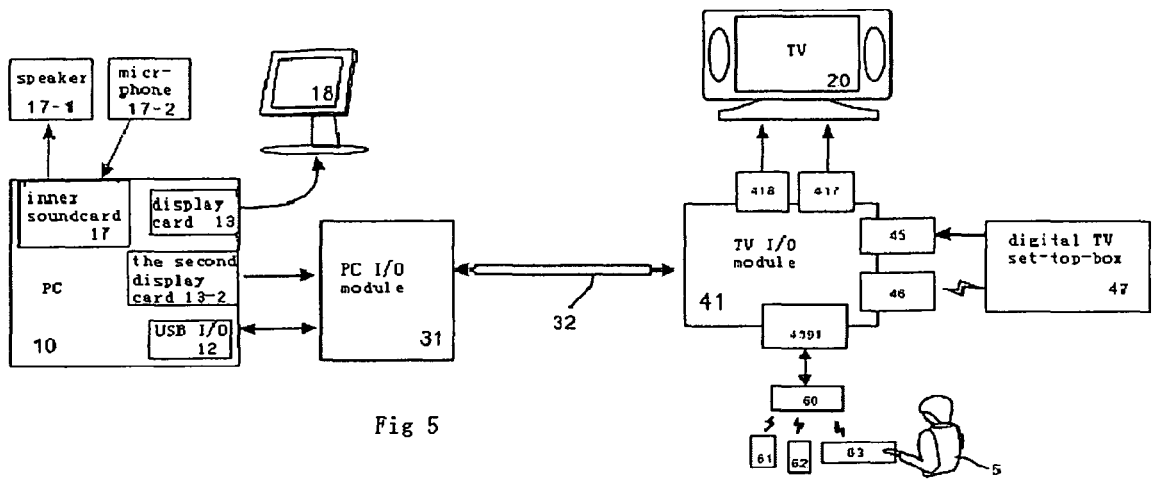
FIG. 5 is a schematic diagram of the dual-workstation mode application.

FIG. 5 shows the dual-workstation mode of this invention. The PC user and TV user each control a set of application software independently that is running in the operating system of the PC through their keyboard, mouse or other equipment and enjoy independently displayed content and sounds. Inner sound card 17 of PC 10 is connected to loudspeaker 17-1 and microphone 17-2 respectively and monitor 18 is connecting with display card 13 of PC 10. PC 10 has an additional display card 13-2 that is connecting with PC interface module 31. Like as the single-workstation mode, wireless keyboard 63, wireless mouse 62 or remote equipment 61 of the TV user are connecting with TV port USB interface 4191 via a wireless receiver for relevant operations. Digital TV set-top box 47 is connecting with TV interface module 41 via USB A/V gathering and compressing device 45. TV interface module 41 is connecting with TV 20 via audio interface 418 and video interface 417.

PC 10 has a display card and a secondary display card. The PC user and TV user can operate the PC at the same time and have independent displays and sound inputs/outputs individually. To work in the dual-workstation mode, PC 10 needs to run multi-workstation of windows to share software installed. Different from FIG. 2, the monitor is not connecting with the video output interface in PC interface module 31.

Figure 6:
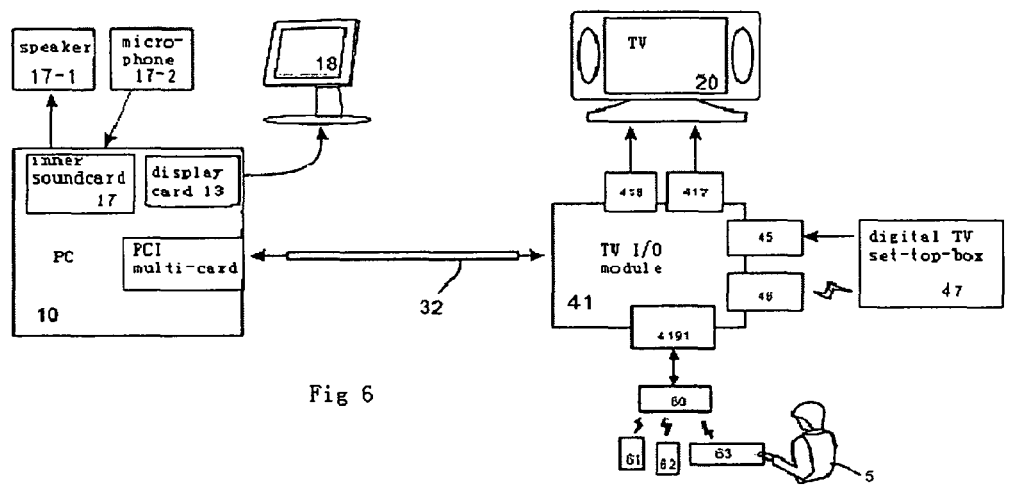
FIG. 6 is a schematic diagram of the improved dual-workstation mode application.

FIG. 6 shows the improved dual-workstation mode. PCI display card, USB interface circuit and PC interface module of PC 10 are integrated into a PCI integrated card 19. As the figure shows, PC 10 has a display card 13 and a PCI card 19. Monitor 18 is connecting with display card 13. The PC user operates PC 10 via monitor 18 and the keyboard and mouse on the computer. Video signals are sent from PC 10 to TV 20 via PCI card 19. TV user remotes control PC 10 via the wireless PC keyboard or remote controller that connecting with TV interface module. In this mode, the TV and PC users do not interfere with each other during operation.

Figure 7:
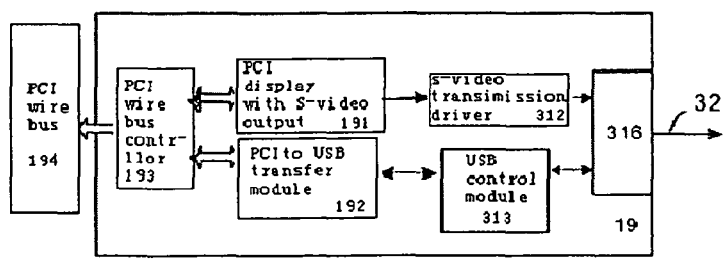
FIG. 7 is a block diagram of the PCI integrated card.

As shown in FIG. 7, PCI display card circuit 191 on PCI integrated card 19 directly outputs S-Video to twisted-pair PC video signal transmission driving circuit 312, following which, it is further output via PC port communication line interface 316. PC port communication line interface 316 is also connecting with PC port USB driver circuit 313, which is connecting PCI with USB converting circuit 192. PCI is connecting with PCI bus 194 via PCI bus controller 193. In PCI integrated card 19, the integrated PC interface module does not need to conduct video format conversion and does not require connection to any external power source. The advantage of this solution is reduced overall cost, simplified installation and convenient user operation.

Figure 8:
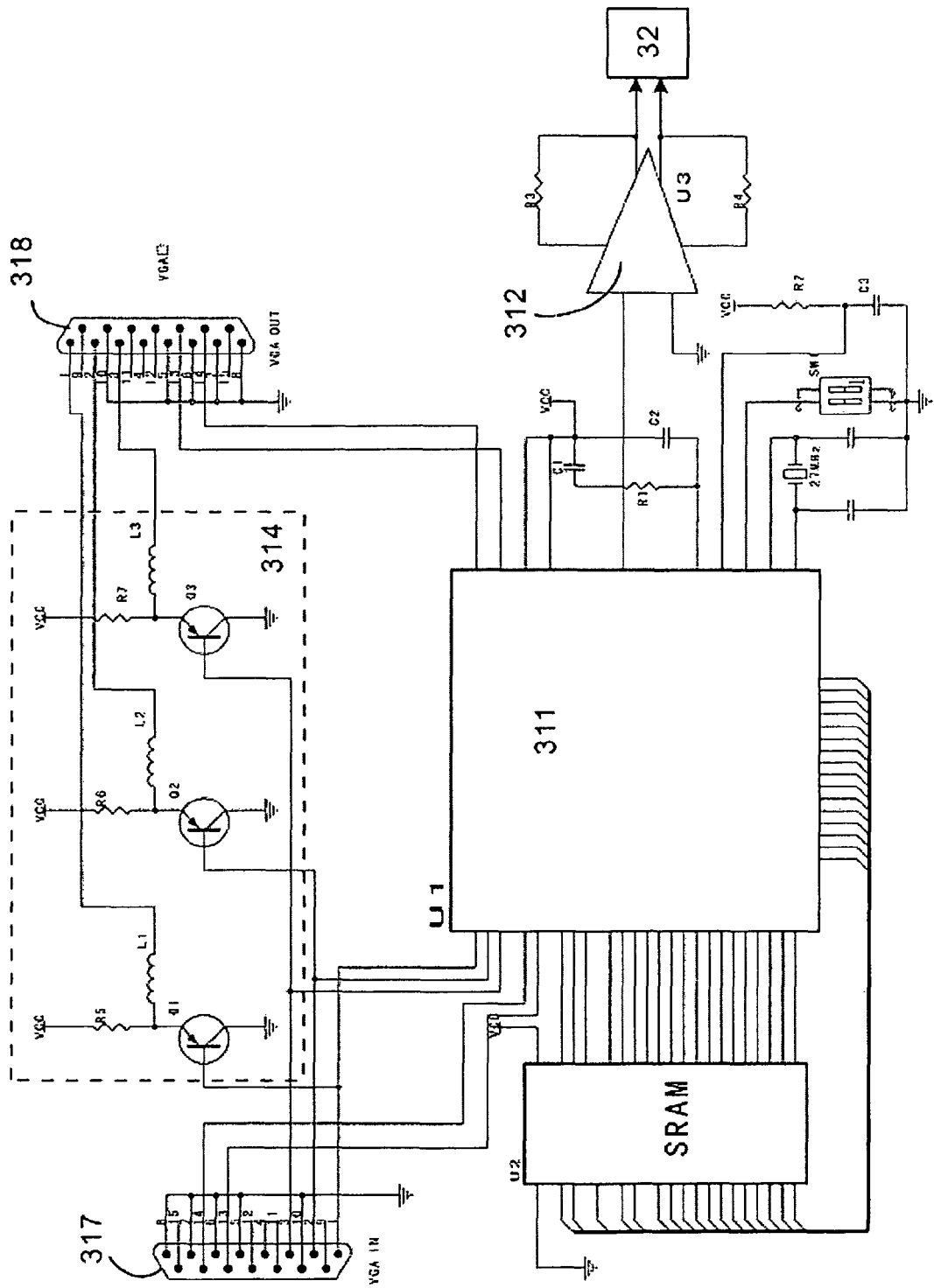
FIG. 8 is a circuit diagram of the PC interface module.

As shown in FIG. 8, PC interface module 31 has video processing chip U1 as PC video signal conversion circuit 311 and Q1-Q3 as VGA signal multiplexing circuit 314. VGA signals are output to VGA output interface 318. Video output interface 318 is connecting with PC monitor 18.

Video processing chip U1 is also connecting with PC video signal transmission driving circuit 312 that comprises of operational amplifier U3. Finally, operational amplifier U3 generates video signals that are output in a differential manner.

Figure 9:
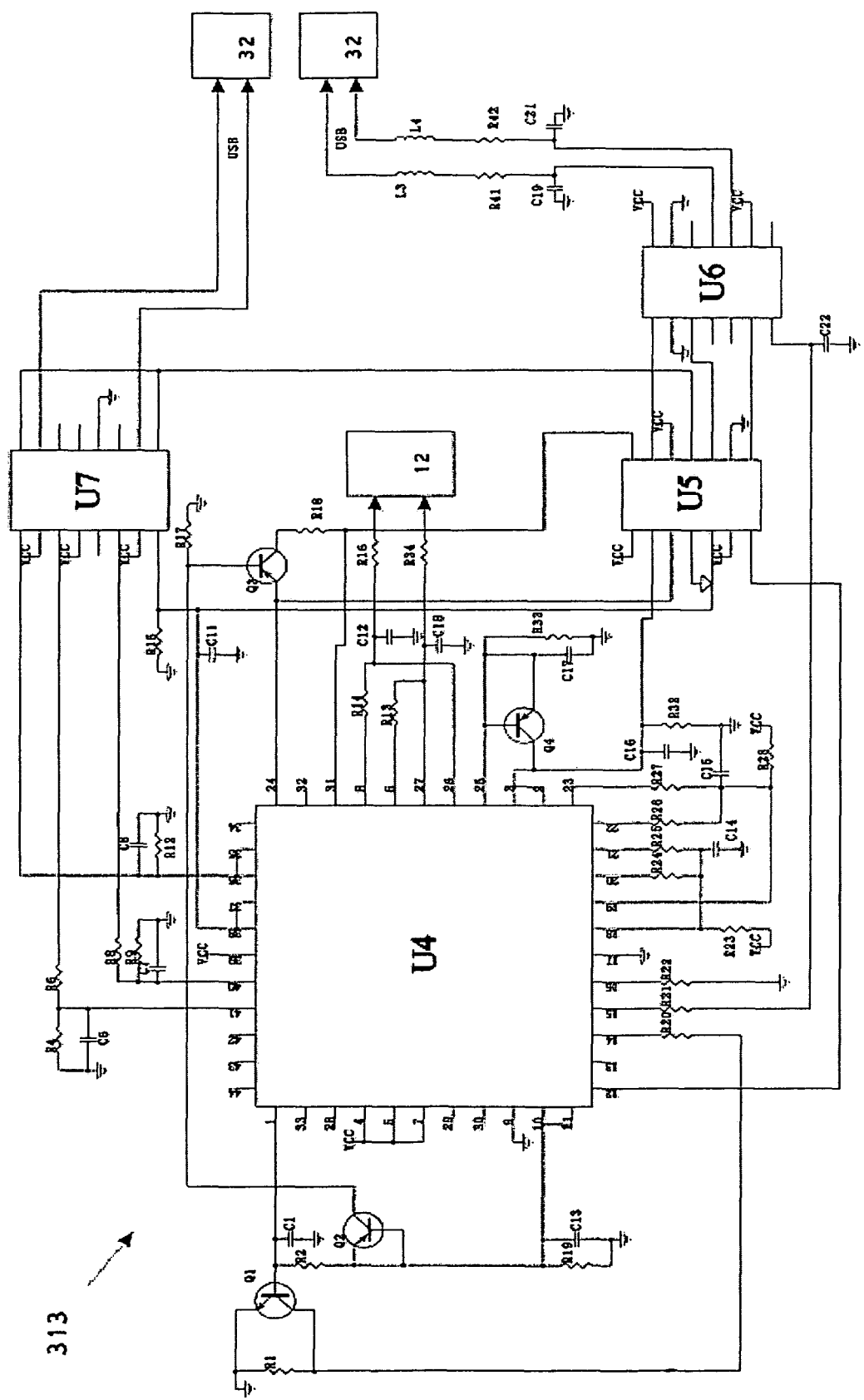
FIG. 9 is a circuit diagram of the part of the USB driver circuit in the PC interface module.

As FIG. 9 shows, the USB bus processing part in PC interface module 31 comprises of USB processing chip U4. USB driving chips U6 and U7 are connecting with the two sets of twisted-pairs in communication cable 32 respectively. The $8^{th}$ and $27^{th}$ pins of USB processing chip U4 are connecting with the USB module interface 12 of PC 10 via R14, R16 and R34 (USB processing chip U4 is Spartan FPGA XCS40XL chip made by Xilinx).

Figure 10:
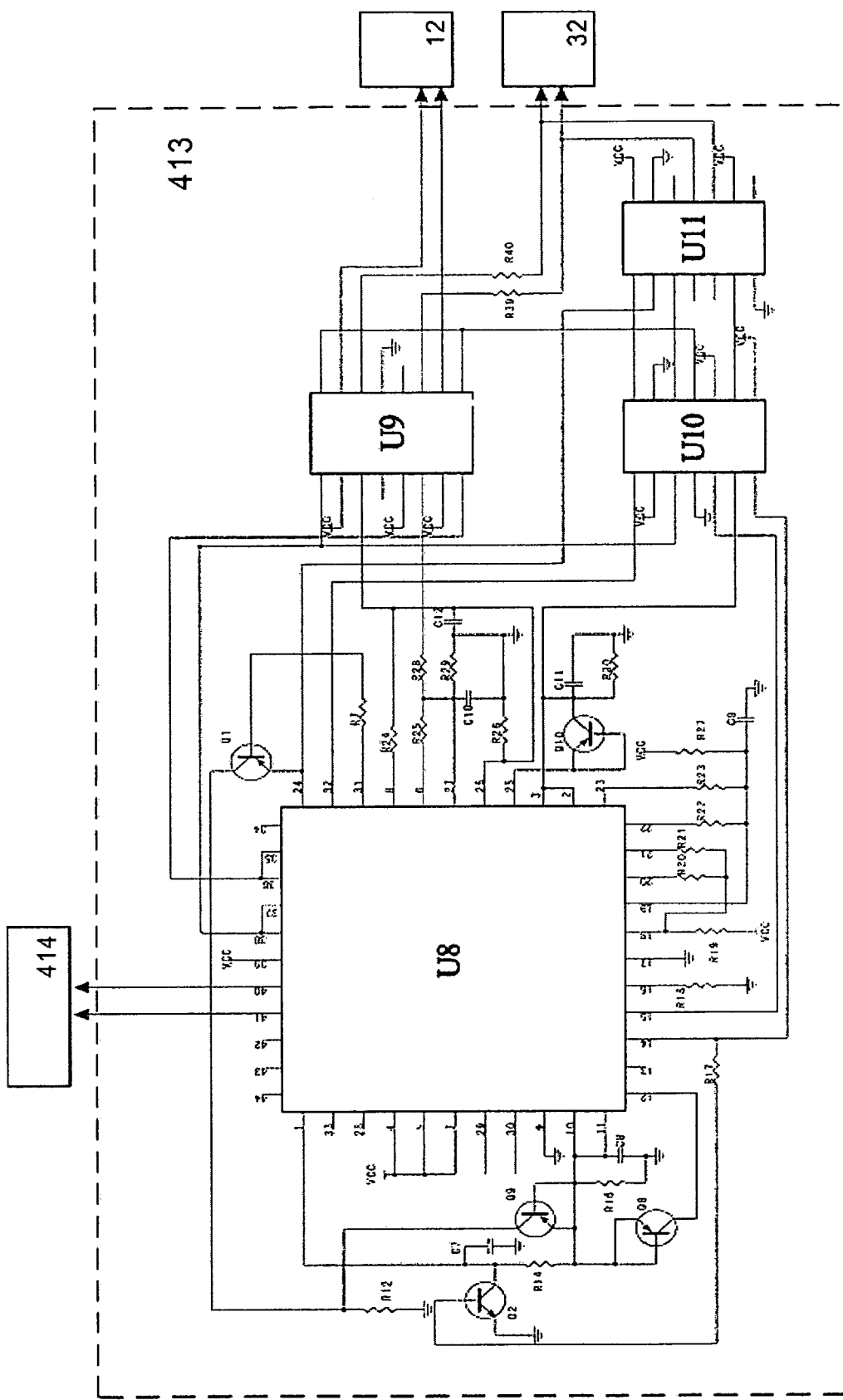
FIG. 10 is a circuit diagram of the part of the USB driver circuit in the TV interface module.

As shown in FIG. 10, the USB bus interface part of TV interface module comprises of TV port USB main control chip U8. USB driving chips U9 and U11 are connecting with the two sets of twisted-pairs in communication line 32 respectively. The $40^{th}$ and $41^{st}$ pins of TV-side USB main control chip U8 are connecting with the USB extended functional unit (TV-side USB main control chip U8 is Spartan FPGA XCS40XL chip made by Xilinx).

Figure 11:
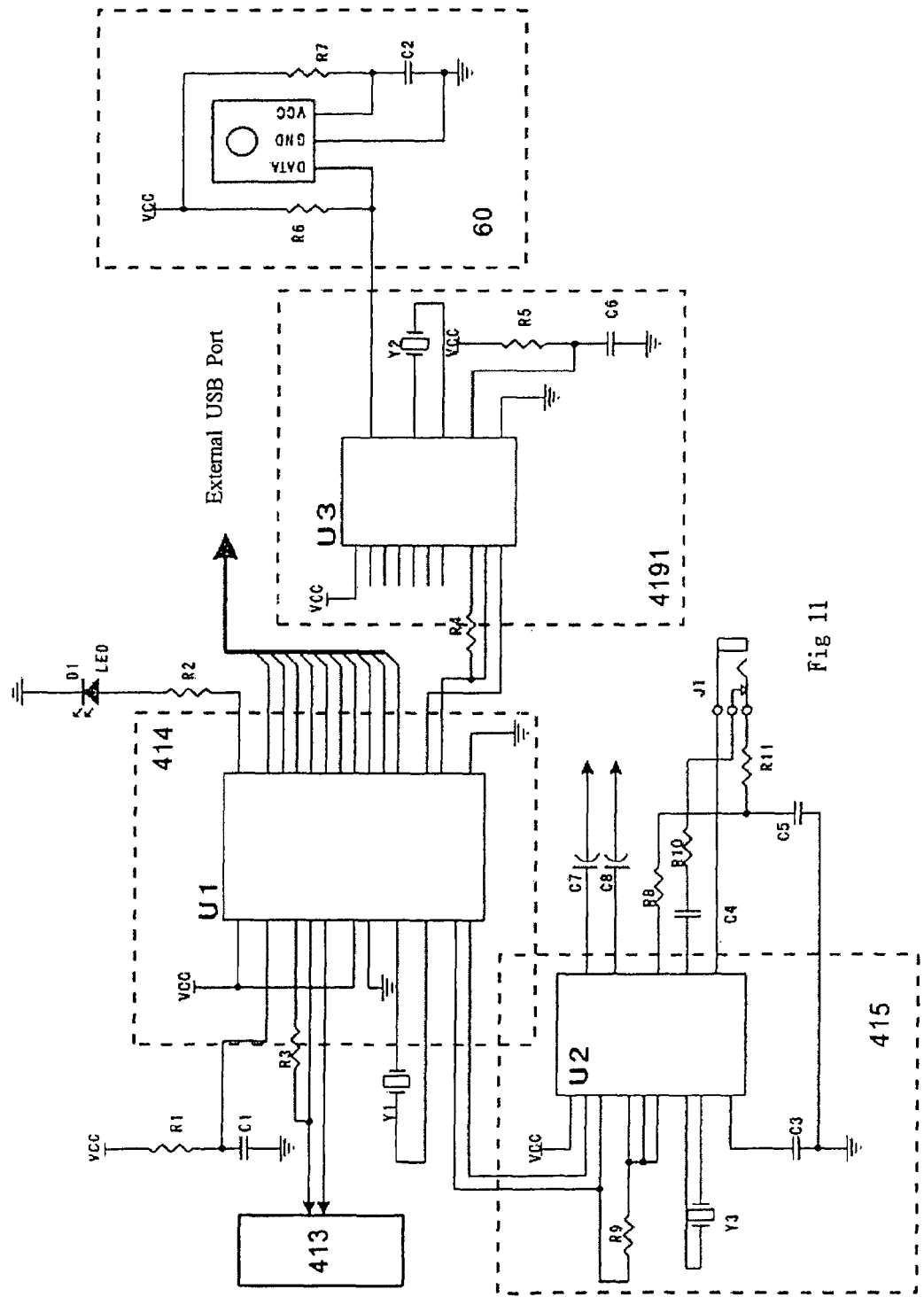
FIG. 11 is a circuit diagram of the TV interface module.

FIG. 11 shows a circuit diagram of an embodiment of the TV interface module of this invention. USB interface 4191 comprises of USB interface chip U14. It is connecting with USB Hub circuit 414, which comprises of USB Hub chip U12. USB Hub chip U12 is connecting with TV-side USB driver circuit 413. Audio processing chip U13, capacitors C7, C8, C5 and C3, crystal oscillator Y3 and resistors R8, R9 and R11 together constitute USB sound card 415, which is connecting with the dual-track audio input and microphone input of the TV.

Figure 12:
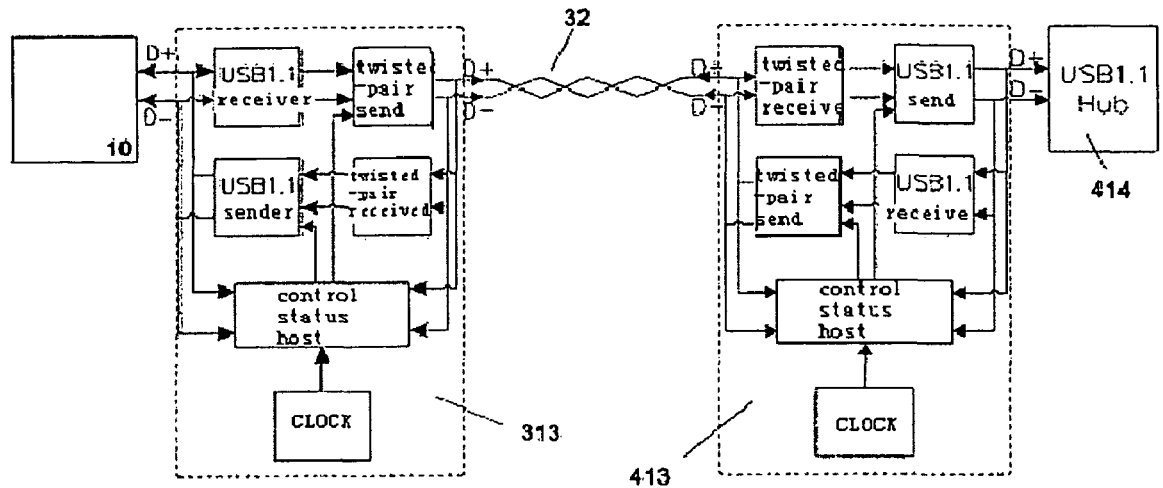
FIG. 12 is a solution diagram for extending USB communication distance.
Figure 13:
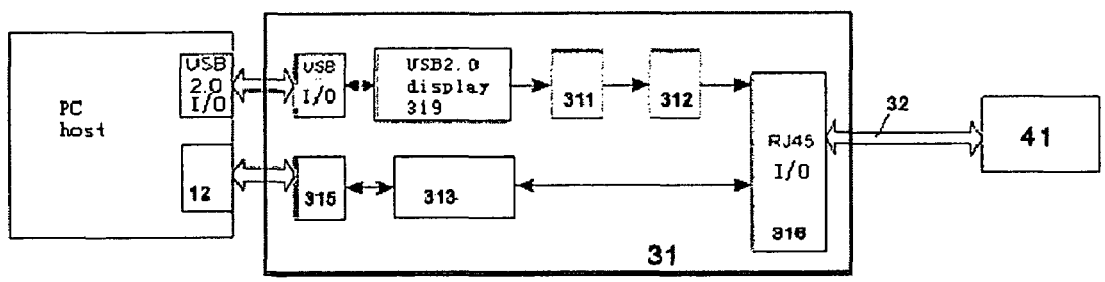
FIG. 13 is a schematic diagram of the embedded USB2.0 display card circuit of the PC interface module.
Figure 14:
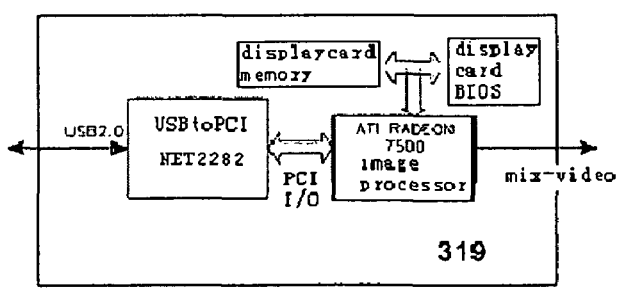
FIG. 14 is a schematic diagram of the USB2.0 display card circuit.

FIGS. 12 to 14 show the different combinations of various parts of the system that can be made according to different applications of the invention, which can reduce implementing costs or improve user's operational convenience.

FIG. 12 shows an embodiment involving PC port USB driver circuit 313 and TV port USB driver circuit 413 of PC interface module 31 and TV interface module 41 respectively in order to increase USB communication distance and adhere to USB 1.1 standards.

In the PC port USB driving transceiver circuit of PC interface module 31, USB signals D+ and D− from USB interface 12 of PC 10 are received by USB 1.1 receiving module and forwarded by the twisted-pair transmission module to one pair of twisted-pairs in CAT5 communication line 32 under the control of the status controller. The USB signals D+ and D− from one pair of twisted-pairs in CAT5 communication line 32 are received by the twisted-pair receiving module and then send to the USB interface of PC 10 by USB1.1 transmission module under the control of the status controller. As the figure shows, the status controller receives the signals from the PC and twisted-pair and controls the time of signal transmission of the twisted-pair transmission module and the USB 1.1 transmission module according to the current USB communication status.

In the TV port USB driver circuit of TV interface module 41, USB signals D+ and D− from the same twisted-pair in CAT5 communication line 32 are received by the twisted-pair receiving module and then send to the Upstream USB interface of USB Hub circuit 414 by USB1.1 transmission module under the control of the status controller. USB signals D+ and D− from Upstream USB interface of USB Hub circuit are received by USB1.1 receiving module and then send to a twisted-pair in CAT5 cable by the twisted-pair transmission module under the control of the status controller. As the figure shows, the status controller receives the signals from the USB Hub circuit and twisted-pair and controls the time of signal transmission of the USB 1.1 transmission module and the twisted-pair transmission module according to the current USB communication status.

The circuit functions in the two blocks as shown in FIG. 12 can be accomplished by a Spartan FPGA XCS4-XL main chip made by Xilinx.

FIG. 13 is a schematic diagram of an embodiment in which a USB2.0 display card circuit is designed into the PC interface module of this invention. As the figure shows, there is no need to connect PC interface module 31 to display card 13 of PC 10. USB display card circuit 319 receives data from USB2.0 interface of PC 10 and converts it into composite video signal before outputting it to the composite video twisted-pair transmission driving circuit 312. USB display card circuit 319 can serve as a replacement to the secondary display card 13-2 of dual-workstation mode as shown in the foregoing figures.

FIG. 14 is a schematic diagram of an embodiment of USB2.0 graphics circuit. As the figure shows, bridge chip NET2282 from USB to PCI is connecting with ATI PCI interface display card RADEON 7500 via PCI bus interface. RADEON 7500 can directly output composite video signals.

Figure 15:
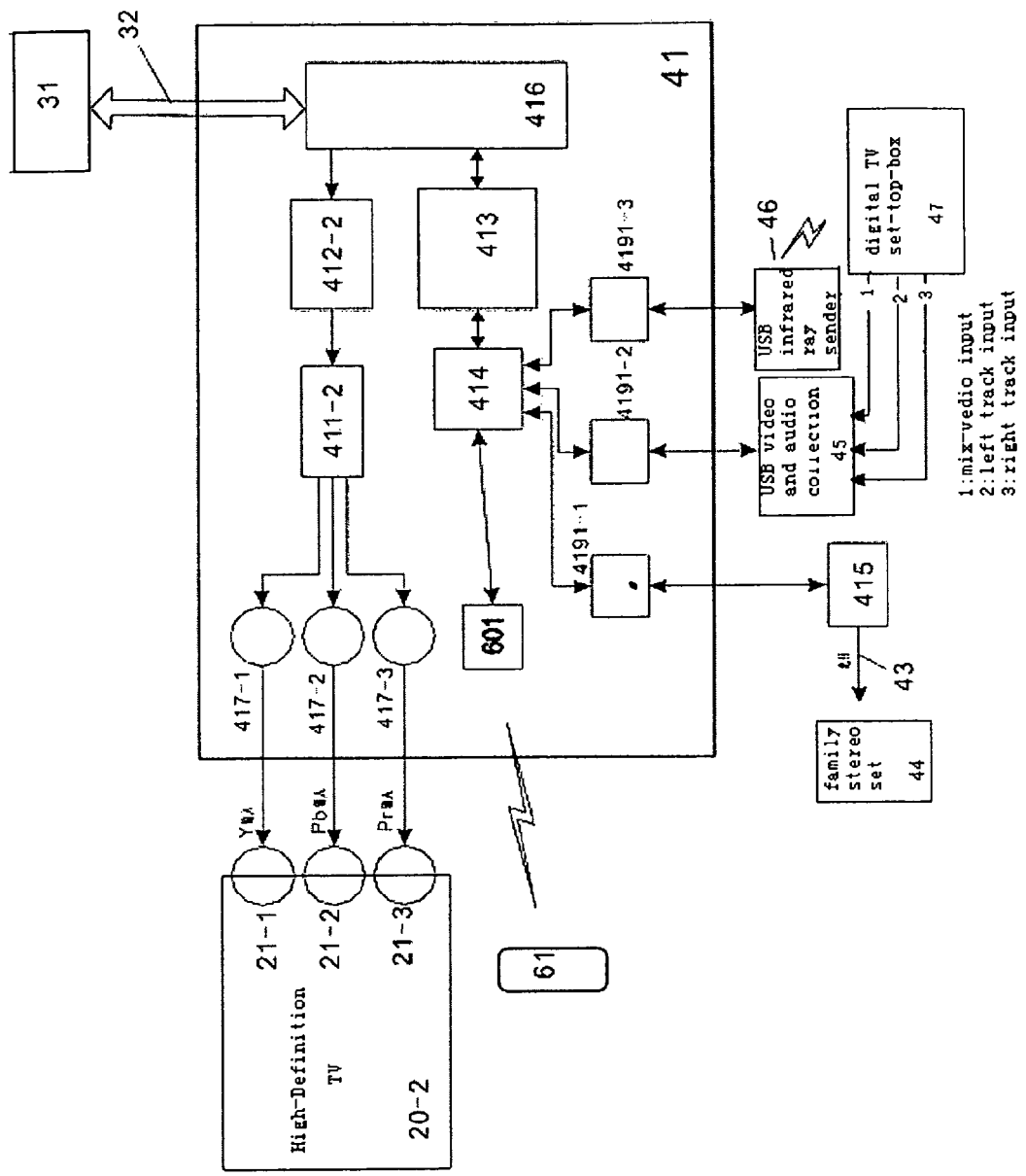
FIG. 15 is a schematic diagram of sending the digital TV signals to PC via the interface module.

FIG. 15 shows an embodiment where cable digital TV signals are transmitted to the PC via TV interface module. As the figure shows, the cable digital TV A/V signals from digital TV set-top box 47 pass USB A/V collection and compression box 45, TV interface module 41 and finally reach PC 10. In FIG. 15, TV interface module 41 is connecting with USB infrared transmitter 46 externally and the transmitter must point towards the infrared receiver of cable digital TV set-top box 47. In this way, the PC user can remotely change the TV channel.

In FIG. 15, TV interface module 41 is also connecting with USB 5.1-track sound card 415 externally. The sound card is connecting with a family audio system 44 via optical fibers. In this way, the TV user 5 can enjoy high-quality audio signals from PC 10. In FIG. 15, USB device 601 of TV interface module 41 is connecting with USB Hub circuit. There are multiple USB interfaces 4191-1, 4191-2 and 4191-3 for connection to multiple USB devices.

This invention presents a cheap and highly powerful solution for TV internet accessing by family users, simplifies the operation of TV internet accessing and enables TV users to enjoy the multimedia content from the internet and a PC in a highly convenient and easy manner. This invention also presents sound solutions to a series of technical problems such as recording programs and moving time shifting for cable TV as well as effective real-time interaction between cable TV channels and TV viewers.

The invention claimed is:

1. A system for TV internet accessing, the system comprising:
    a PC;
    a TV set;
    a communication cable;
    a PC connecting set, comprising: a PC connecting set host designed with a PC interface module integrated with a PC video signal driver circuit, a PC port communication cable interface, a PC port display card interface, a PC port USB driver circuit and a PC port USB interface, where a port of the PC video signal driver circuit is connected with the PC port display card interface and a port of the PC port communication cable interface, a port of the PC port USB driver circuit is connected with the PC port USB interface and another port of the PC port communication cable interface, and the PC port communication cable interface transmits video signals and USB signals over the communication cable; and
    a TV connecting set, comprising: a TV connecting set host designed with a TV interface module integrated with a TV video signal receiving circuit, a TV port USB driver circuit, a USB Hub circuit, a TV port communication cable interface and a TV port video interface, where a port of the TV video signal receiving circuit is connected with the TV port video interface and another port is connected with the TV port communication cable interface, a port of the TV port USB driver circuit is connected with the USB Hub circuit and another port is connected with the TV port communication cable interface, wherein, a display card interface A of the PC is connected with the PC port display card interface of the PC connecting set, a USB interface of the PC is connected with the PC port USB interface, the PC port communication cable interface of the PC connecting set is connected with the TV port communication cable interface of the TV connecting set via the communication cable, the TV port video interface of the TV connecting set is connected with a video input interface B of the TV, and a TV port audio interface is connected with an audio interface B of the TV, wherein in a dual-workstation mode, a PC user and a TV user each control a set of application software that is independently running in an operating system of the PC through respective keyboard, mouse or remote controllers at the respective TV and PC, and enjoy independently displayed content and sounds.

2. The system of claim 1, wherein a VGA output interface of the PC connecting set is connected with a monitor.

3. The system of claim 2, wherein the PC USB interface together with the USB Hub circuit, a USB device in the TV interface module and an external USB device form a USB system, and video signals output from the PC display card interface A are transmitted to the TV via the PC interface module and the TV interface module.

4. The system of claim 1, wherein the PC includes a primary and secondary display card, the primary display card being connected with the PC port display card interface and the secondary display card being connected with a monitor.

5. The system of claim 4, wherein the PC USB interface together with the USB Hub circuit, a USB device in the TV interface module and an external USB device form a USB system, and video signals output from the PC display card interface A are transmitted to the TV via the PC interface module and the TV interface module.

6. The system of claim 1, wherein the PC includes a primary and secondary display card, the primary display card being connected with a monitor and the secondary display card being connected with the PC port display card interface.

7. The system of claim 6, wherein the secondary display card and the PC interface module are integrated into a PCI integrated card, said PCI integrated card is designed in the PC and connected with the TV interface module via the communication cable.

8. The system of claim 7, wherein the PC USB interface together with the USB Hub circuit, a USB device in the TV interface module and an external USB device form a USB system, and video signals output from the PC display card interface A are transmitted to the TV via the PC interface module and the TV interface module.

9. The system of claim 6, wherein the PC USB interface together with the USB Hub circuit, a USB device in the TV interface module and an external USB device form a USB system, and video signals output from the PC display card interface A are transmitted to the TV via the PC interface module and the TV interface module.

10. The system of claim 1, further comprising an external USB device, said external USB device being connected with the TV port USB interface.

11. The system of claim 10, wherein the PC USB interface together with the USB Hub circuit, a USB device in the TV interface module and an external USB device form a USB system, and video signals output from the PC display card interface A are transmitted to the TV via the PC interface module and the TV interface module.

12. The system of claim 1, wherein the PC USB interface together with the USB Hub circuit, a USB device in the TV interface module and an external USB device form a USB system, and video signals output from the PC display card interface A are transmitted to the TV via the PC interface module and the TV interface module.

13. The system of claim 12, wherein a USB A/V collection and compression device digitally gathers and compresses TV A/V signals transmitted from a TV A/V signal source and sends them to the PC via the TV interface module and the PC interface module.

14. A method for operating the system of claim 1 in a single-workstation mode, comprising a PC user and a TV user jointly controlling a single set of application software running in an operating system of the PC through respective keyboard, mouse or remote controller at the respective TV and PC and enjoying the same displayed content and sounds.

15. The system of claim 1, wherein the PC interface module is also integrated with a VGA signal multiplexing circuit and a VGA output interface, the VGA output interface being connected with the PC port display card interface via the VGA signal multiplexing circuit.

16. The system of claim 1, wherein the PC interface module is also integrated with a PC video signal conversion circuit, where a port of the PC video signal conversion circuit is connected with the PC port display card interface and another port is connected with the PC video signal driver circuit.

17. The system of claim 1, wherein the TV interface module is also integrated with a TV video signal conversion circuit, where a port of the TV video signal conversion circuit is connected with the TV port video interface and another port is connected with the TV video signal receiving circuit.

18. The system of claim 1, wherein the TV interface module is also integrated with a USB device and a TV port USB interface, said USB device being connected with the USB Hub circuit and the TV port USB interface is connected with the USB Hub circuit.

19. The system of claim 1, wherein the USB device is a USB sound card, said USB sound card is connected with the USB Hub circuit, and said USB sound card is integrated with a TV port audio interface and a TV port microphone interface.

20. The system of claim 1, wherein the USB device is either a USB-PS2 interface converter, a USB infrared receiver, a USB radio-frequency receiver, a USB A/V collection and compression device or a combination thereof.

21. A method for operating system for TV interne accessing,
the system comprising:
a PC;
a TV set;
a communication cable;
a PC connecting set, comprising: a PC connecting set host designed with a PC interface module integrated with a PC video signal driver circuit, a PC port communication cable interface, a PC port display card interface, a PC port USB driver circuit and a PC USB interface, where a port of the PC video signal driver circuit is connected with the PC port display card interface and a port of the PC port communication cable interface, a port of the PC port USB driver circuit is connected with the PC port USB interface and another port of the PC port communication cable interface, and the PC port communication cable interface transmits video signals and USB signals over the communication cable; and a TV connecting set, comprising: a TV connecting set host designed with a TV interface module integrated with a TV video signal receiving circuit, a TV port USB driver circuit, a USB Flub circuit, a TV port communication cable interface and a TV port video interface, where a port of the TV video signal receiving circuit is connected with the TV port video interface and another port is connected with the TV port communication cable interface, a port of the TV port USB driver circuit is connected with the USB Hub circuit and another port is connected with the TV port communication cable interface, wherein, a display card interface A of the PC is connected with the PC port display card interface of the PC connecting set, a USB interface of the PC is connected with the PC port USB interface, the PC port communication cable interface of the PC connecting set is connected with the TV port communication cable interface of the TV connecting set via the communication cable, the TV port video interface of the TV connecting set is connected with a video input interface B of the TV, and a TV port audio interface is connected with an audio interface B of the TV, the method for operating the system in a dual-workstation mode, comprising a PC user and a TV user each controlling a set of application software that is independently running in an operating system of the PC through respective keyboard, mouse or remote controllers at the respective TV and PC and enjoying independently displayed content and sounds.

* * * * *